(12) United States Patent
Poulis et al.

(10) Patent No.: US 12,511,557 B1
(45) Date of Patent: Dec. 30, 2025

(54) SYSTEM AND METHOD FOR EXPLAINING AND CONTESTING OUTCOMES OF GENERATIVE AI MODELS WITH DESIRED EXPLANATION PROPERTIES

(71) Applicant: SEEKR Technologies, Inc., Vienna, VA (US)

(72) Inventors: Stefanos Poulis, Vienna, VA (US); Andrew J Bauer, Vienna, VA (US); Diego A. Mesa, Vienna, VA (US); Robin J. Clark, Vienna, VA (US); Patrick C. Condo, Vienna, VA (US)

(73) Assignee: Seekr Technologies Inc., Vienna, VA (US)

( * ) Notice: Subject to any disclaimer, the term of this patent is extended or adjusted under 35 U.S.C. 154(b) by 0 days.

(21) Appl. No.: 19/032,776

(22) Filed: Jan. 21, 2025

(51) Int. Cl.
*G06N 5/045* (2023.01)
*G06N 20/00* (2019.01)

(52) U.S. Cl.
CPC ............. *G06N 5/045* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,696,962 A | 12/1997 | Kupiec | |
| 5,909,510 A | 6/1999 | Nakayama | |
| 6,026,388 A | 2/2000 | Liddy et al. | |
| 6,119,114 A | 9/2000 | Smadja | |
| 6,226,668 B1 | 5/2001 | Silverman | |
| 6,601,075 B1 | 7/2003 | Huang et al. | |
| 6,651,057 B1 | 11/2003 | Jin et al. | |
| 6,807,565 B1 | 10/2004 | Dodrill et al. | |
| 6,847,969 B1 | 1/2005 | Mathai et al. | |
| 6,990,514 B1 | 1/2006 | Dodrill et al. | |
| 7,062,485 B1 | 6/2006 | Jin et al. | |
| 7,076,484 B2 | 7/2006 | Dworkis et al. | |
| 7,120,925 B2 | 10/2006 | D'Souza et al. | |
| 7,197,497 B2 | 3/2007 | Cossock | |
| 7,240,067 B2 | 7/2007 | Timmons | |
| 7,313,622 B2 | 12/2007 | Lee et al. | |
| 7,475,404 B2 | 1/2009 | Hamel | |
| 7,516,123 B2 | 4/2009 | Betz et al. | |
| 7,606,810 B1 | 10/2009 | Jeavons | |
| 7,827,125 B1 | 11/2010 | Rennison | |
| 7,836,060 B1 | 11/2010 | Rennison | |

(Continued)

FOREIGN PATENT DOCUMENTS

WO   WO/0077690 A1   12/2000

OTHER PUBLICATIONS

Freedman, Gabriel, et al. "Argumentative large language models for explainable and contestable decision-making." arXiv preprint arXiv:2405.02079 (2024). (Year: 2024).*

(Continued)

*Primary Examiner* — Daniel T Pellett
(74) *Attorney, Agent, or Firm* — Manatt, Phelps & Phillips, LLP

(57) ABSTRACT

A system and method for explaining and contesting outcomes of AI models, such as generative AI models, provides a desired explanation with desired explanation properties and provides a contestability feature. The system and method may also provide a remediation process when an AI model response is contested.

26 Claims, 11 Drawing Sheets

(56) References Cited

U.S. PATENT DOCUMENTS

| | | |
|---|---|---|
| 7,870,117 B1 | 1/2011 | Rennison |
| 7,925,973 B2 | 4/2011 | Allaire et al. |
| 7,933,893 B2 | 4/2011 | Walker et al. |
| 8,001,064 B1 | 8/2011 | Rennison |
| 8,060,518 B2 | 11/2011 | Timmons |
| 8,195,666 B2 | 6/2012 | Jeavons |
| 8,219,911 B2 | 7/2012 | Clarke-Martin et al. |
| 8,478,758 B2 | 7/2013 | Jeavons |
| 10,733,452 B2 | 8/2020 | Attorre |
| 11,875,240 B1 | 1/2024 | Bosnjakovic |
| 11,893,981 B1 | 2/2024 | Clark et al. |
| 11,921,731 B2 | 3/2024 | Baeza-Yates |
| 12,124,932 B1 | 10/2024 | Poulis et al. |
| 12,174,903 B1 | 12/2024 | Poulis et al. |
| 12,182,678 B1 | 12/2024 | Poulis et al. |
| 12,210,535 B1 | 1/2025 | Poulis et al. |
| 12,254,872 B2 | 3/2025 | Clark et al. |
| 2001/0021934 A1 | 9/2001 | Yokoi |
| 2002/0007393 A1 | 1/2002 | Hamel |
| 2002/0062340 A1 | 5/2002 | Kloecker et al. |
| 2002/0095336 A1 | 7/2002 | Trifon et al. |
| 2002/0147578 A1 | 10/2002 | O'Neil et al. |
| 2002/0169669 A1 | 11/2002 | Stetson et al. |
| 2002/0169771 A1 | 11/2002 | Melmon et al. |
| 2003/0191816 A1 | 10/2003 | Landress et al. |
| 2003/0212954 A1 | 11/2003 | Patrudu |
| 2003/0217052 A1 | 11/2003 | Rubenczyx et al. |
| 2004/0049574 A1 | 3/2004 | Watson et al. |
| 2004/0117400 A1 | 6/2004 | McCrystal et al. |
| 2005/0091200 A1 | 4/2005 | Melton et al. |
| 2005/0144158 A1 | 6/2005 | Capper |
| 2005/0188402 A1 | 8/2005 | de Andrade et al. |
| 2006/0031419 A1 | 2/2006 | Huat |
| 2006/0047632 A1 | 3/2006 | Zhang |
| 2006/0117348 A1 | 6/2006 | D'Souza et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0260671 A1 | 11/2007 | Harinstein et al. |
| 2008/0010142 A1 | 1/2008 | O'Brien et al. |
| 2008/0104113 A1 | 5/2008 | Wong |
| 2008/0221983 A1 | 9/2008 | Ausiannik et al. |
| 2009/0024574 A1 | 1/2009 | Timmons |
| 2009/0197581 A1 | 8/2009 | Gupta et al. |
| 2009/0248668 A1 | 10/2009 | Zheng |
| 2010/0100545 A1 | 4/2010 | Jeavons |
| 2010/0313116 A1 | 12/2010 | Hyman |
| 2011/0166918 A1 | 7/2011 | Allaire et al. |
| 2011/0191163 A1 | 8/2011 | Allaire et al. |
| 2012/0078895 A1 | 3/2012 | Chu-Carroll |
| 2012/0143792 A1 | 6/2012 | Wang |
| 2013/0318063 A1 | 11/2013 | Ayzenshtat |
| 2015/0095014 A1 | 4/2015 | Marimuthu |
| 2016/0021037 A1 | 1/2016 | Hewitt |
| 2018/0101534 A1 | 4/2018 | Alexander, Jr. |
| 2019/0065744 A1 | 2/2019 | Gaustad |
| 2019/0082224 A1 | 3/2019 | Bradley |
| 2019/0147062 A1 | 5/2019 | Kim |
| 2019/0163327 A1 | 5/2019 | Otero |
| 2020/0125639 A1 | 4/2020 | Doyle |
| 2020/0126533 A1 | 4/2020 | Doyle |
| 2021/0004420 A1 | 1/2021 | Mittal |
| 2021/0019339 A1 | 1/2021 | Ghulati |
| 2021/0058352 A1 | 2/2021 | Fogu et al. |
| 2021/0097239 A1 | 4/2021 | Arora et al. |
| 2021/0240700 A1 | 8/2021 | Ling et al. |
| 2023/0316000 A1 | 10/2023 | Mukherjee |
| 2024/0111498 A1 | 4/2024 | Vaughn |
| 2024/0184991 A1 | 6/2024 | Mahabaleshwarkar |
| 2024/0202221 A1 | 6/2024 | Siebel |
| 2024/0281472 A1 | 8/2024 | LaRhette |
| 2024/0419713 A1 | 12/2024 | Siebel |
| 2025/0021568 A1 | 1/2025 | Poulis et al. |
| 2025/0209352 A1* | 6/2025 | Steimer .................. G06N 5/045 |

OTHER PUBLICATIONS

Landau, Susan, et al. "Challenging the Machine: Contestability in Government AI Systems." arXiv preprint arXiv:2406.10430 (2024). (Year: 2024).*

Leofante, Francesco, et al. "Contestable ai needs computational argumentation." arXiv preprint arXiv:2405.10729 (2024). (Year: 2024).*

Guzey, Isil, et al. "Context-dependent explainability and contestability for trustworthy medical artificial intelligence: Misclassification identification of morbidity recognition models in preterm infants." arXiv preprint arXiv:2212.08821 (2022). (Year: 2022).*

Chen, Guizhen, et al. "Exploring the potential of large language models in computational argumentation." arXiv preprint arXiv:2311.09022 (2023). (Year: 2023).*

Beaudouin, Valérie, et al. "Flexible and context-specific AI explainability: a multidisciplinary approach." arXiv preprint arXiv:2003.07703 (2020). (Year: 2020).*

Bai, et al., "Constitutional AI: Harmlessness from AI Feedback", 34 pages, arXiv:2212.08073v1 [cs.CL] Dec. 15, 2022.

Confalonieri, et al., "A Historical perspective of explainable Artificial Intelligence", WIREs Data Mining and Knowledge Discovery published by Wiley Periodicals LLC., Sep. 2020, WIREs Data Mining Knowl Discov. 2021;11:e1391., https://doi.org/10.1002/widm.1391.

Das, "Opportunities and Challenges in Explainable Artificial Intelligence (XAI): A Survey", Department of Electrical and Computer Engineering, University of Texas at San Antonio, San Antonio, TX, 78249, arXiv:2006.11371v2 [cs.CV] Jun. 23, 2020.

Dawson, Algorithmic Adjudication and Constitutional AI—The Promise of a Better AI Decision Making Future?, 29 pages, 27 SMU Science & Technology L. Rev. 11 (2024).

Goush, et al., "A Closer Look at the Limitations of Instruction Tuning", 31 pages, arXiv:2402.05119v5 [cs.CL] Jul. 14, 2024.

Dosilovic, et al., "Explainable Artificial Intelligence: A Survey", 7 pages, University of Zagreb, Conference Paper • May 2018, DOI: 10.23919/MIPRO.2018.8400040.

Gunning, et al., "XAI—Explainable Artificial Intelligence", 6 pages, City, University of London Institutional Repository, 2019, Science Robotics, 4(37), caay7120. DOI: 10.1126/scirobotics.aay7120.

Huang, et al., "Collective Constitutional AI: Aligning a Language Model with Public Input", 23 pages, arXiv:2406.07814v1 [cs.AI] Jun. 12, 2024.

Mecklenburg, et al., "Injecting New Knowledge Into Large Language Models via Supervised Fine-Tuning", 16 pages, arXiv:2404.00213v2 [cs.CL] Apr. 2, 2024.

Mitra, et al., "AgentInstruct: Toward Generative Teaching with Agentic Flows", 32 pages, arXiv:2407.03502v1 [cs.AI] Jul. 3, 2024.

Shen, et al., "Large Language Model Alignment: A Survey", 76 pages, College of Intelligence and Computing, Tianjin University, Tianjin China, arXiv:2309.15025v1 [cs.CL] Sep. 26, 2023.

Wang, et al., "Chain-of-Thought Reasoning without Prompting", 23 pages, 2024 Google DeepMind, arXiv:2402.10200v2 [cs.CL] May 23, 2024.

Xu, et al., "A Survey on Knowledge Distillation of Large Language Models", 43 pages, arXiv:2402.13116v4 [cs.CL] Oct. 21, 2024.

Zeng, et al., Scaling of Search and Learning: A Roadmap to Reproduce o1 from Reinforcement Learning Perspective, 51 pages, arXiv:2412.14135v1 [cs.AI] Dec. 18, 2024.

Gekham, et al., "Does Fine-Tuning LLMS on New Knowledge Encourage Hallucinations?", 20 pages, Technion—Israel Institute of Technology, Google Research, arXiv:2405.05904v3 [cs.CL] Oct. 1, 2024.

Durante, "Agent AI: Surveying the Horizons of Multimodel Interaction", Jan. 25, 2024 (Year: 2024).

Baulepur, "Aligning Language Models with Factuality and Truthfulness" Thesis submitted in partial fulfillment of Bachelor of Science in Computer Science, University of Illinois at Urbana-Champaign, 2023, 50 pages.

Azaria, et al., "The Internal State of an LLM Knows When its Lying", School of Computer Science, Ariel University, Israel and Machine Learning Dept., Carnegie Mellon University, Pittsburgh, PA, Apr. 2023, 10 pages.

(56) References Cited

OTHER PUBLICATIONS

Lee, et al., "Linguistic Properties of Truthful Response," University of Pennsylvania, PA, USA., Jun. 2023, 6 pages.
Poulis, "Algorithms for Interactive Machine Learning", Dissertation submitted in partial fulfillment of degree of Doctor of Philosophy in Computer Science, University of California, San Diego, 2019, 148 pages.
Yang, et al., "RefGPT: Reference—Truthful & Customized Dialogues Generation by GPTs and for GPTs", Shanghai Jiao Tong University, Hong Kong Polytechnical University, Beijing University of Posts and Telecommunications, May 2023, 20 pages.
Pan, et al., "On the Risk of Misinformation Pollution with Large Language Models", National University of Singapore, University of California, Santa Barbara, University of Waterloo, MBZUAI, Zhejiang University, May 2023, 14 pages.
McKenna, et al., "Sources of Hallucination by Large Language Models on Inference Tasks", University of Edinburgh, Google Research, Macquarie University, May 2023, 17 pages.
Sun, "Principle-Driven Self-Alignment of Language Models from Scratch with Minimal Human Supervision", 37th Conference on Neural Information Processing Systems, 2023. (Year: 2023).
Siriwardhana, "Improving the Domain Adaptation of Retrieval Augmented Generation (RAG) Models for Open Domain Question Answering", Transactions of the Association for Computational Linguistics, vol. 11, pp. 1-17, 2023. (Year: 2023).
Zhang, "Self-Tuning: Instructing LLMs to Effectively Acquire New Knowledge through Self-Teaching" Jun. 2024, 30 pgs, https://arxiv.org/abs/2406.06326.
Rozner, "Knowledge Editing in Language Models via Adapted Direct Preference Optimization" Sep. 2024, 13 pgs, https://arxiv.org/abs/2406.09920.
Ye, "Qilin Med: Multi-stage Knowledge Injection Advanced Medical Large Language Model", 13 pgs, Apr. 2024.
Ovadia, "Fine-Tuning or Retrieval? Comparing Knowledge Injection in LLMs", Jan. 2024, 14 pgs, https://arxiv.org/abs/2312.05934.
Zhu, "FanOutQA: A Multi-Hop, Multi-Document Question Answering Benchmark for Large Language Models" Jun. 2024, 20 pgs, https://arxiv.org/abs/2402.14116.
Soudani, "Fine Tuning vs. Retrieval Augmented Generation for Less Popular Knowledge" Dec. 2024, 11 pgs, https://arxiv.org/abs/2403.01432.
Zhang, "RAFT: Adapting Language Model to Domain Specific RAG" 12 pgs, Jun. 2024, https://arxiv.org/abs/2403.10131.
Angelov, "Explainable artificial intelligence: an analytical review", 13 pages, Jun. 10, 2021, WIREs Data Mining Knowl Discov. 2021;11:e1424, https://doi.org/10.1002/widm.1424.
Abiri, "Public Constitutional AI", 2024.
Claude, "Collective Constitutional AI:Aligning a Language Model with Public Input",2023. Webpage: file///Collective%20Constitutional%20 AI_%20.

\* cited by examiner

SYSTEM AND METHOD FOR EXPLAINING AND CONTESTING OUTCOMES OF GENERATIVE AI MODELS WITH DESIRED EXPLANATION PROPERTIES

FIELD

The disclosure relates to artificial intelligence (AI) models and a system and method for explaining and contesting outcomes of generative AI models.

BACKGROUND

In recent years, the rapid advancement of Generative Artificial Intelligence (AI) models and Large Language Models (LLMs) has led to their widespread deployment across various domains, including healthcare, finance, legal, medical, education, and more. However, the increasing complexity of AI models, particularly those leveraging deep learning techniques with billions of parameters, has resulted in a "black-box" nature where the decision-making processes are difficult to understand and interpret. This contributes to their opacity and poses significant challenges, particularly when these systems are responsible for making decisions that impact human lives and that may have significant monetary, safety, or ethical implications.

The field of Explainable AI (XAI) has emerged to address the critical challenges and needs associated with the increasing complexity and opacity of AI models. Some reasons for the emergence of XAI are:
1. Transparency: Generative AI models and more generally, large neural networks function as "black boxes", meaning that their decision-making processes are difficult for human to understand
2. Trust: For Generative AI models to be widely adopted in high-stakes domains such as healthcare, finance, law, medical etc. model users must trust their decisions. Explainability fosters trust by exposing how these decisions are made.
3. Regulations and Compliance: Certain regulations, such as GDPR (General Data Protection Regulation), demand that automated decision-making processes must be explainable to humans.
4. Error and Bias Detection and Mitigation: AI models may make errors due to insufficient training data and inherent biases that might be present in their training dataset. XAI helps identify errors and biases and address them.
5. Accountability and Responsibility: When AI models make errors or produce biased outcomes, organizations need to understand and explain these outcomes to ensure accountability. XAI enables organizations to identify the root cause of such issues and justify decisions made by AI.
6. Enhanced Human-AI Collaboration: XAI bridges the gap between humans and AI, enabling more effective collaboration. It allows humans to interpret, judge, contest and improve AI outcomes.
7. High-Stakes Decision Making: In areas such as criminal justice, medical, autonomous driving etc., understanding the rationale behind AI decision making is necessary to avoid catastrophic consequences.

Current Approaches to XAI

The landscape of current XAI can be categorized into three main areas, each focusing on a specific aspect of explainability of AI systems. Those three areas are:

1. Context Attribution: Focusing on identifying which parts of the input context or prompt are responsible for driving a generative AI model's response. This is particularly relevant for generative models like transformers or LLMs, where the output depends heavily on nuanced patterns in the input.
2. Model Attribution: Dissecting the internal mechanisms of AI models, such as, specific layers, neurons, activations, attention weights, etc. to determine which parts of the model architecture are responsible for specific decisions or outcomes.
3. Data Attribution: Tracing the influence of specific data points or subsets of the training dataset on the AI model's decisions.

XAI techniques generate an explanation of a AI model's reasoning and outcome. For any XAI technique, in order for AI model outcomes to be understandable by humans, AI explanations must have a number of properties (Properties of AT Explanations) that include:
1. Faithfulness: Explanations should have fidelity to and accurately reflect the AI model's decision-making process and chain-of-thought reasoning
2. Plausibility: Explanations should be understandable and actionable by humans or by other AI systems
3. Consistency: Inputs that yield similar outputs should be receiving similar explanations
4. Sufficiency: Explanations should accurately describe the model's decision-making process and chain-of-thought reasoning without superfluous details The current XAI techniques use one of the above techniques to generate explainability data and have some of the properties listed above. However, none of the known techniques combine two or more of the above XAI categories and integrated them together. It would be desirable to combine two or more of the above XAI categories to achieve better explanations.

Designing an explanation system with all the above properties (faithfulness, plausibility, consistency, and sufficiency) is a significant challenge and requires careful consideration. The difficulty is due to the very nature of how Generative AI models and more generally, machine learning models learn their behavior and operate. In particular, these models derive patterns from data and one must consider the implication of the learning from data done in machine learning when designing explanation systems with these properties. Amongst other things, noise in data, stochasticity in model training algorithms, distribution under-representation etc. may lead to different sources of error during the learning process and those errors may not be discoverable by any of the attribution processes individually.

A fundamental concept in a model learning from data is the bias-variance tradeoff, wherein model performance is a balance between two sources of error: bias and variance. In the context of statistical machine learning, bias refers to the error introduced by approximating a real-world, overly complex problem, by a simplified model (not to be confused with other types of bias, such as data bias, algorithmic bias, cultural bias, social bias etc.). A model with high bias typically underfits the data, which often leads to systematic errors. Variance on the other hand, refers to the errors introduced when a model is too sensitive to small changes in the training data. High variance typically occurs when the model adapts too closely to the training data, a phenomenon called overfitting. As a result, the model performs well on the training set but generalizes poorly to unseen data. As discussed below, the concept of bias-variance trade-off has implications into explainability and into which approach is suitable to strike the right balance.

From an explainability standpoint, models with high bias, such as linear models with a small number of parameters, tend to be more explainable because their structure and decision-making processes are more transparent and interpretable. On the other hand, high variance models with millions or billions of parameters tend to be overly complex, making them harder to interpret.

To make complex models more explainable, approaches such as, Local Interpretable Model-Agnostic Explanations (LIME), focus on approximating an overly complex model "locally" with a simpler but much more interpretable model—such approaches fall under Context Attribution. However, as mentioned above, a local and much simpler model, although explainable, suffers from high bias, as it does not accurately capture the structures that the complex (original) model has learned and consequently, runs the risk of producing explanations that are not faithful to the original model's decision-making process. Thus, Context Attribution explanation approaches, although able to offer some good understanding of local behavior suffer from bias issues and need to be complemented with approaches that are more faithful to the model's true decision process.

Model Attribution approaches focus on dissecting the internal mechanisms of complex models by capturing things such as, the roles of neurons, layers, weights etc. The resulting underlying explanations are far more faithful to the model's decision making than Context Attribution methods, which are only an approximation to model behavior. However, Context Attribution methods are based on high-variance models; that is, small changes to model inputs lead to vastly different model outputs. Consequently, explanations based solely on Model Attribution suffer from lack of consistency, as similar inputs may lead to vastly different explanations.

Data Attribution methods measure the influence of data points from the model's training set. Such explanations are simple, hence plausible, in that they can be easily understood by a human.

In summary: 1) context attribution methods offer simple explanations that are easier to interpret but may not be faithful to the model's decision making, due to the high bias of oversimplified models; 2) model attribution methods offer model-specific insights and explanations that are faithful the model's internal workings but not be plausible, in that they are hard to be understood by a human; and 3) data attribution methods focus on surfacing specific examples from the training set, leading to explanations that are easily understandable by humans, that is, explanations that are plausible. Hence, the bias-variance tradeoff along with the desired properties of AI explanations, demand a different approach Contestability allows a human to challenge and question the decisions made by automated systems, such as AI models. Contestability is crucial for maintaining fairness and due process, ensuring that decisions affecting individuals can be contested if error or bias is suspected. Often embedded in legal frameworks as a requirement, contestability promotes accountability and enhances system improvements by identifying systemic errors.

Explainability enables contestability in a number of ways:
1. Providing clear insights into the decision-making processes of automated systems, making it easier to identify and rectify biases and errors.
2. Identifying and rectifying issues that may arise from biased data, missing training data, systematic errors, edge cases etc.
3. Fostering trust by ensuring humans can understand the rationale behind decisions
4. Enhancing human engagement by enabling users of AI systems to better understand, question, challenge and pursue changes to decisions that may affect an organization in various ways.

None of the known XAI techniques provide any contestability features. It is desirable for a system and method to both generate explanations with the multiple properties above and provide a contestability feature. Thus, it is desirable to provide a system and method that merges and synthesizes attribution signals and provides contestability that are not provides by the current known techniques.

DETAILED DESCRIPTION OF ONE OR MORE EMBODIMENTS

Figure 1:
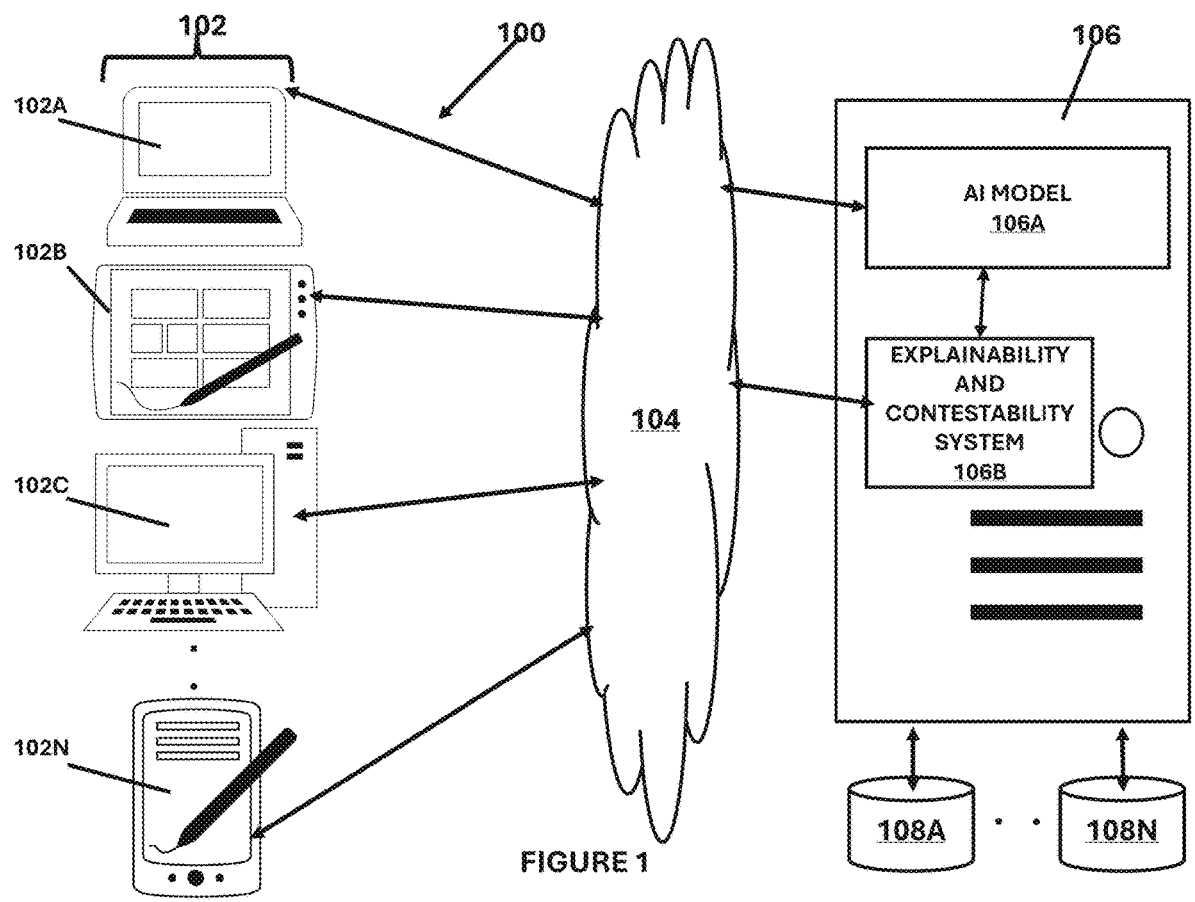
FIG. 1 illustrates a system that generates responses using an artificial intelligence model that includes an explainability and contestability system.

The disclosure is particularly applicable to comprehensive framework for explaining and contesting Generative AI model outcomes through an XAI aggregation system and it is in this context that the disclosure will be described. It will be appreciated, however, that the system and method has greater utility since it may be used for explaining and contesting various other known or yet to be developed artificial intelligence (AI) models wherein a generative AI model is the illustrative example of AI models. Furthermore, the system and method may be implemented in other architectures that are within the scope of disclosure may include additional processes and techniques that are also within the scope of the disclosure.

The disclosure is directed to an explainability and contestability system that overcomes the limitations of the current systems and technique. The present disclosure is directed towards a technical solution, systems, and methods for explaining and contesting AI model outcomes. This innovative approach is designed to combine one or more of the attribution approaches and to ensure that explanation properties are satisfied, thereby overcoming limitations associated with the current techniques that utilize one attribution method and provide a contestability feature wholly missing from current systems and techniques. This disclosure provides a significant advancement in the field of machine learning and AI models, addressing critical needs and offering practical applications in various industries in which it is desirable to provide explainability that satisfies the explainable properties and contestability.

In more detail, in the illustrative embodiment of the system discussed below, the system and method integrates multiple explainable AI (XAI) techniques—Context Attribution, Model Attribution, and Data Attribution—to generate holistic explanations of model behavior based on a combination of the multiple XAI techniques. These explanations are synthesized by an aggregator XAI controller, such as an LLM agent, that can leverage a specialized reasoning model to resolve conflicts between the different attribution signals. The novel synthesized explanation synthesize all and only necessary components of an explanation to produce explanations that are also sufficient, hence satisfying all four properties that was not achievable by the known and existing techniques.

The framework includes a structured contestability process where users can either accept or challenge model outputs based on the quality and implications of the explanation. In cases of contestation, the system offers two remediation pathways to the user: a model retraining workflow that generates new training data to adjust model behavior, or the implementation of inference-time guardrails to safeguard against identified issues. The remediation pathways may be implemented, in one embodiment using the AI model alignment methods disclosed in U.S. Pat. Nos. 12,124,932 and 12,182,678 that are owned by the same assignee as this disclosure and are incorporated herein by reference.

In various embodiments of the system and method, the framework generates AI explanations that have the following properties: 1) Faithfulness: Explanations should have fidelity to and accurately reflect the AI model's decision-making process and chain-of-thought reasoning; 2) Plausibility: Explanations should be understandable and actionable by humans or by other AI systems; 3) Consistency: Inputs that yield similar outputs should be receiving similar explanations; and 4) Sufficiency: Explanations should accurately describe the model's decision-making process and chain-of-thought reasoning without superfluous details.

The resultant explanation summary adheres to the four essential properties that ensure its effectiveness and utility. Through a validation mechanism, the explanation maintains faithfulness to the original model's decision-making process, it achieves plausibility for business stakeholders, it maintains consistency, and finally it ensures sufficiency. The multi-faceted validation approach (described below) enables the system to generate explanations that are both technically accurate and business-actionable, serving as a reliable foundation for decision-making about model outputs and potential model response remediation needs.

FIG. 1 illustrates a system 100 that generates responses using an artificial intelligence model that includes an explainability and contestability system 106B. Although the architecture shown in a client server architecture, the system may be implemented using one or more application programming interfaces (APIs) that may be used by third parties to interact with the artificial intelligence (AI) model 106A and the explainability and contestability system 106B. Furthermore, the AI model 106A and explainability and contestability system 106B may not be part of the same system (FIG. 1 shows them as part of the same system) in which the system may include the explainability and contestability system 106B and may interface with third party AI models and provide explainability and contestability for the third party AI model. The AI model 106A may be a large language model (LLM), a large multimodal model (LMM) or other AI models that may benefit from explainability and contestability. For example, the AI model also may be a small language models (SLM) or a small multimodal model (SMM) which are smaller, distilled, or more focused language models that have a smaller computational/infrastructural footprint and that can be used for "edge computing" (i.e. on-device) such as the computing devices 102 shown in FIG. 1. The LLM, LMM, SLM or SMM are each a type of machine learning model designed for natural language processing tasks such as generation of content.

In an embodiment in which the system has its own artificial intelligence model (AI Model) 106A as shown in FIG. 1, the system may have a plurality of trained and/or aligned AI models 106A housed in the system 100 in which some of the AI model may be aligned to a different domain and may be selected by a user. Alternatively, the system 100 may have an AI model aligned to multiple different domain principles that may be used by the system. For the embodiment with post-training alignment of the AI model 106A, the system may apply the alignments for the principles specific (the alignment process as disclosed in U.S. Pat. Nos. 12,124, 932 and 12,182,678) for each domain to generate the aligned responses using the existing/conventional already trained AI model.

In an embodiment in which the AI model 106A is housed in a backend 106 of the system as shown in FIG. 1, the system 100 may receive inputs from one or more users over a computer network 104 that are received by a backend system 106 that, using a AI model 106A, generates a response to the user that is delivered to the user via a user interface of the backend system 106. Thus, each user may generate a query/prompt for the AI Model 106A that may be generated on a computing device 102 of the user and then transmitted over the computer network 104 to the backend system 106. The AI model 106A may generate a response based on the user prompt/query and return the response to the computing device 102 using the user interface engine. In one instance in which the AI model 106A is aligned with principles of a specific domain, it may delivery an aligned response to the user and examples of the user prompts and responses from known LLMs and the aligned AI Model 106A for the GARM domain, the civility domain, the agriculture domain, internal enterprise document domain, files from a computer system domain and a set of blog posts domain are provided in U.S. Pat. Nos. 12,124,932 and 12,182,678 and those examples are incorporated herein by reference.

In an embodiment in which a third party AI model 106A is trained by the system 100 and/or post-trained for alignment as disclosed in U.S. Pat. Nos. 12,124,932 and 12,182, 678, the user may, using APIs, submit a prompt to the third party AI model 106A and the results of the response to the prompt are: 1) already trained by the system 100; or 2) adjusted to be aligned to the domain specific principles as disclosed in U.S. Pat. Nos. 12,124,932 and 12,182,678. When post-inference is performed by the system 100, the results, adjusted to the domain specific principles and thus aligned to those domain specific principles, are then returned to the user so that the user benefits from the AI model 106A aligned to the domain specific principles as discussed in detail in U.S. Pat. Nos. 12,124,932 and 12,182,678.

In the embodiment in which the AI model 106A is a SLM or a SMM, the AI model may be executed on one of the computing devices 102. In this embodiment, the user may query the AI model 106A on the computing device and the computing device 102 may communicate the initial AI model results and query to the backend 106 that then performs the explainability and contestability processes and returns the explanation and recommendation to the computing device for display to the user of the computing device 102. If the recommendation is to contest the response from the AI model, the backend 106 receives the user response to contest the response and then performs the model remediation process as described below.

Figure 2:
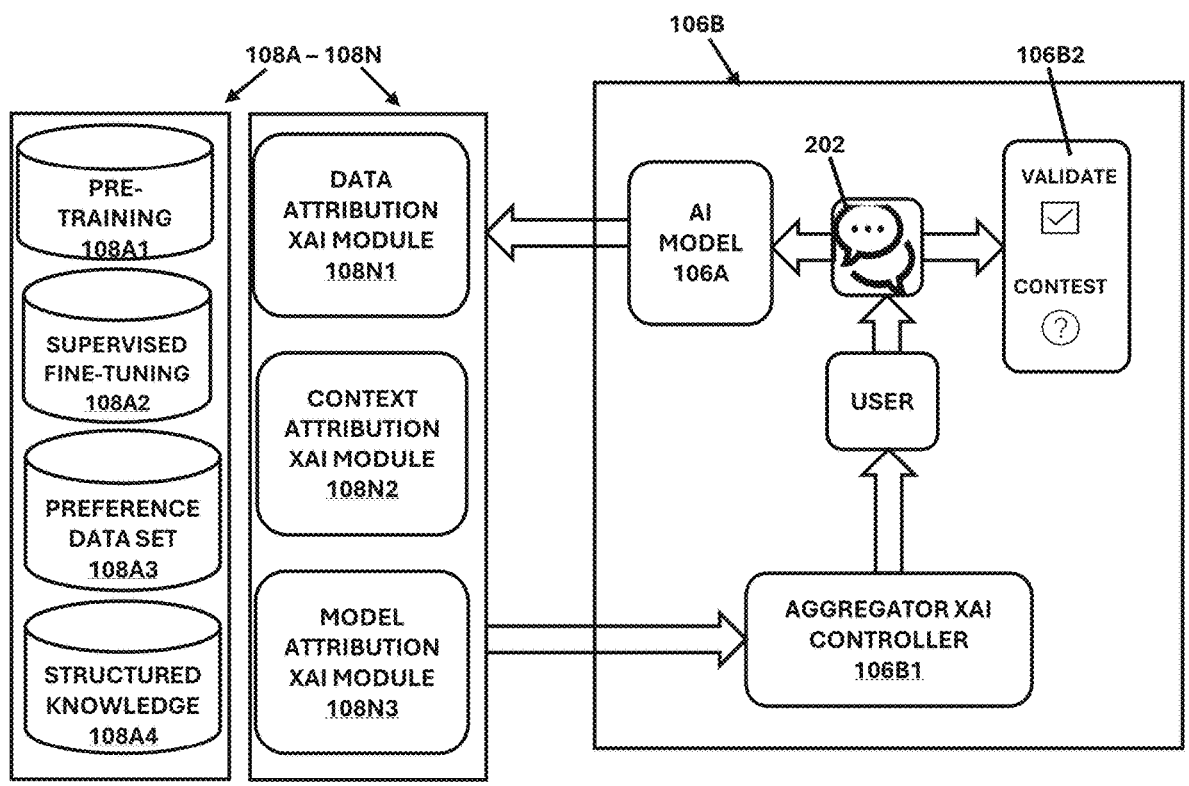
FIG. 2 illustrates more details of the explainability and contestability system shown in FIG. 1 that is responsible for distilling, processing and combining the explanations from each approach into a summary that is understandable by a human.

The explainability and contestability system 106B of the system 100 may generate, for each prompt/query, an explanation of the AI model reasoning as disclosed below and provide a contestability feature that includes a model remediation process to adjust the AI model when/if the user contests the reasoning of the AI model 106A. The explainability and contestability system 106B of the system 100 may operate on an already training AI model, a fine tuned AI model and/or an aligned AI model. Furthermore, the explainability and contestability system 106B may interface with a local AI model (as shown in FIGS. 1-2) or it may retrieve/receive a response from a remote AI Model (on another or third party computer system) and then return the explanation and contestability data for the other or third party computer system.

As shown in FIG. 1, the system 100 allows a plurality of users to interact with the system 100 over the network 104 using a computing device 102. Each computing device 102 is a processing unit based device with inputs/outputs (one or more of a touchscreen, keyboard, mouse, display, etc.,) and circuits for communicating over the network 104 with the backend 106. The user may interact using a browser application executed by the processor of the computing device 102 or using a mobile application or downloaded application that is also executed by the processor of the computing device 102. For example, each computing device 102 may be a laptop computer 102A, a tablet computer 102B, a personal computer 102C, . . . , and/or a phone or smartphone device 102N, such as a Apple® iPhone® or a Google® Android® operating system based device.

The network 104 may use a communications protocol (TCP/IP) and a data transfer protocol (such as HTTP or HTTPS) or a yet to be developed communications and data transfer protocol to allow each computing device 102 and the backend system to connect to each other and communicate with each other. The network 104 may comprising one or more wired or wireless communication paths including Ethernet, a digital data network, a cellular data network, a cellular network, a WAN, a LAN, a backhaul network and the like.

The backend system 106 may be one or more computing resources including memory and processors that are configured to implement the processes of the explainability and contestability system 106B as described below including the generating of the explanation of the AI model reasoning, the contestability process and the model remediation process and may, if the AI model 106A is operated by the backend 106, receive prompts and generate responses to the user prompts that may or may be aligned response from an aligned AI model. For example, the one or more computing resources may be cloud computing resources from Amazon AWS or Microsoft Azure, a server computer, an application computer and the like.

In addition to the AI model 106A and a user interface module that generates user interfaces provided to the user by the system, the backend 106 may further comprise the explainability and contestability system 106B that generates an explanation of the AI model reasoning based on multiple attributions discussed below, implement the contestability process that allows the user to accept or contest a response from the AI model 106A based on the explanation and implement a model remediation process to adjust the AI model when the user contests the response from the AI model based on the generated explanation. The details of the explainability and contestability system 106B as discussed below with reference to FIGS. 2-11. In one embodiment, the AI model 106A, the explainability and contestability system 106B and the user interface engine may each be a plurality of lines of computer code/instructions executed by a processor of the backend computer system 106 that implement the processes of those systems wherein the processor is configured to perform those processes as discussed below. The backend system 106 may be coupled to one or more data stores 108A, . . . , 108N that store the instructions/computer code for the AI model 106A and the user interface engine, the corpus of data used to train the AI model 106A, the instructions/computer code for the explainability and contestability system 106B. the instructions/computer code for each of the attribution processes discussed below and/or various other data used by the system. In one implementation, one or more of the data stores may be known vector databases 108B that store embeddings associated with the AI model as described below.

In one implementation, the AI model 106A (that may be trained, fine tuned and/or aligned with domain specific principles as disclosed in U.S. Pat. Nos. 12,124,932 and 12,182,678) may be an LLM/LMM that may be language models with many parameters, and are trained with self-supervised learning on a vast amount of text. Similarly, the LMM may be a multimodal model with many parameters, trained with self-supervised learning on a vast amount of text. Alternatively, the AI model may be a Language Representation Model, such as GPT (Generative Pre-trained Transformer) models, BERT (Bidirectional Encoder Representations from Transformers), and RoBERTa, a Zero-shot Model, such as GPT-3, a Multimodal Model, such as OpenAI's CLIP and/or a Fine-tuned or Domain-specific Models. The AI model may also be an encoder-decoder model, a transformer-based model, a fine tuned model and/or a multilingual model. The AI models 106A may be trained AI models and/or aligned AI models that are aligned to one or more specific domains as disclosed in U.S. Pat. Nos. 12,124,932 and 12,182,678 that are owned by the same assignee as this disclosure and are incorporated herein by reference. Examples of current unaligned LLMs may include GPT launched by Open AI, Pathways Language Model (PaLM) developed by Google AI or PaLM 2 LLM that is currently being used for Google's latest version of Google Bard, XLNet that is an autoregressive Transformer that combines the bidirectional capability of BERT and the autoregressive technology of Transformer-XL to improve the language modeling task, BERT (Bidirectional Encoder Representations from Transformers) which is a deep learning-based technique for NLP developed by Google Brain or LlaMA (Large Language Model Meta AI) launched by Meta.

FIG. 2 illustrates more details of the explainability and contestability system 106B shown in FIG. 1 that is responsible for distilling, processing and combining the explanations from each approach into a summary that is understandable by a human. FIG. 2 also shows the other data that may be accessible by the system 100 including pre-training data 108A1 used for some of the training of the AI model 106A, a set of supervised fine-tuning data 108A2 used to fine tune the AI model 106A, a preference data set 108A3 that may contain preference data such as the datasets used for reinforcement learning with human feedback, and a structured knowledge data store 108A4. The stores may include data/information about the AI model 106A being queried/prompted that may be used by the model attribution process to access the AI Model and generate a model attribution result.

FIG. 2 also shows more details of the attribution modules 108N1-108N3 that are aggregated/combined as discussed below to generate the explanation for the AI model reasoning. In one embodiment, each attribution module may be implemented as a plurality of lines of computer code/instructions that are executed by a processor of the backend 106 to configure the processor to perform the attribution process. The system may include a data attribution module 108N1, a context attribution module 108N2 and a model attribution module 108N3. The data-based attribution process (shown in more detail in FIG. 8) performed by the module probes the relationship between a model's training data (pre-training, supervised fine-tuning, RLHF, etc.—anything that was used to alter a model's weights) and generated outputs. The content Attribution process (shown in more detail in FIG. 6) may generate causal relationships between certain statements given in the model's input/context and the model's generated output. That is, the solution attributes pieces of the output, to specific pieces of the input provided to the AI model. The model attribution process (shown in more detail in FIG. 7) may discover/explain the internal workings of an AI model by analyzing/exploring how specific components/networks contribute to model behavior. It is noted that each of the attribution processes are known in the art, but that none of the current techniques combine two or more of these attribution techniques together to generate the explanations as discussed below in more detail.

Figure 3:
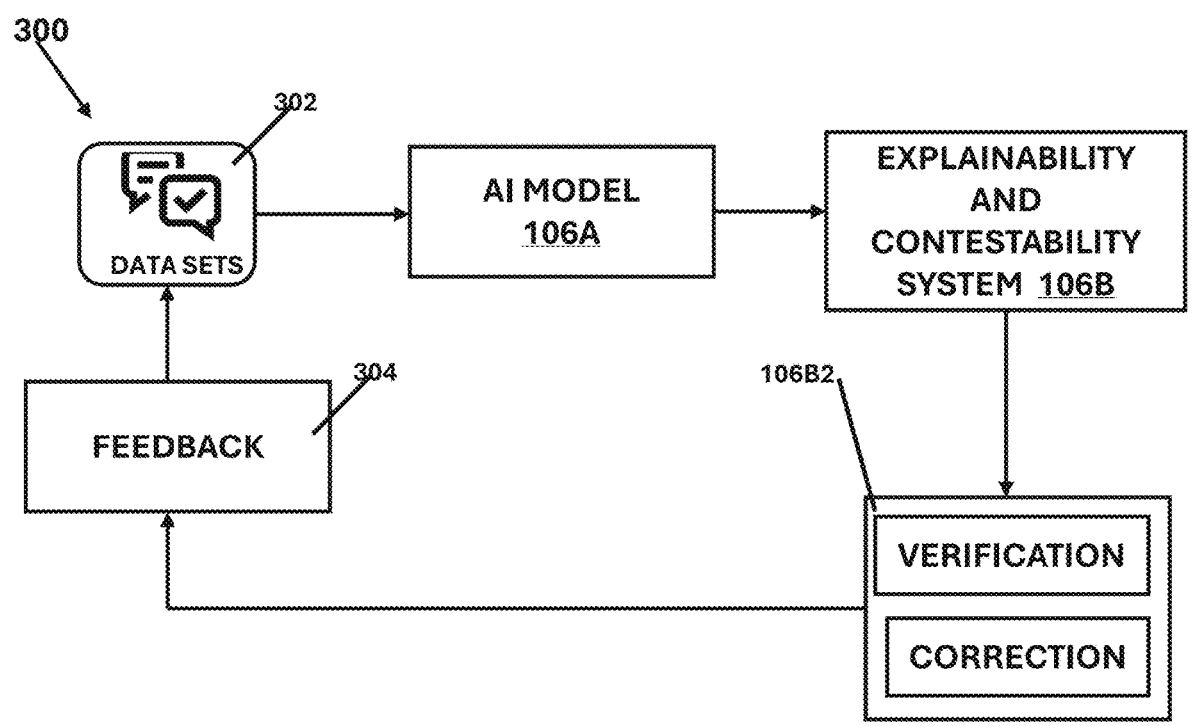
FIG. 3 shows a data flow of the system in FIGS. 1 and 2 that received an input query and generates a summary explanation understandable by a human that enables an operator to validate or contest the model output, as well as, to provide the reasoning/feedback for the contention so that feedback/reasoning may be used to correct model behavior.
Figure 5:
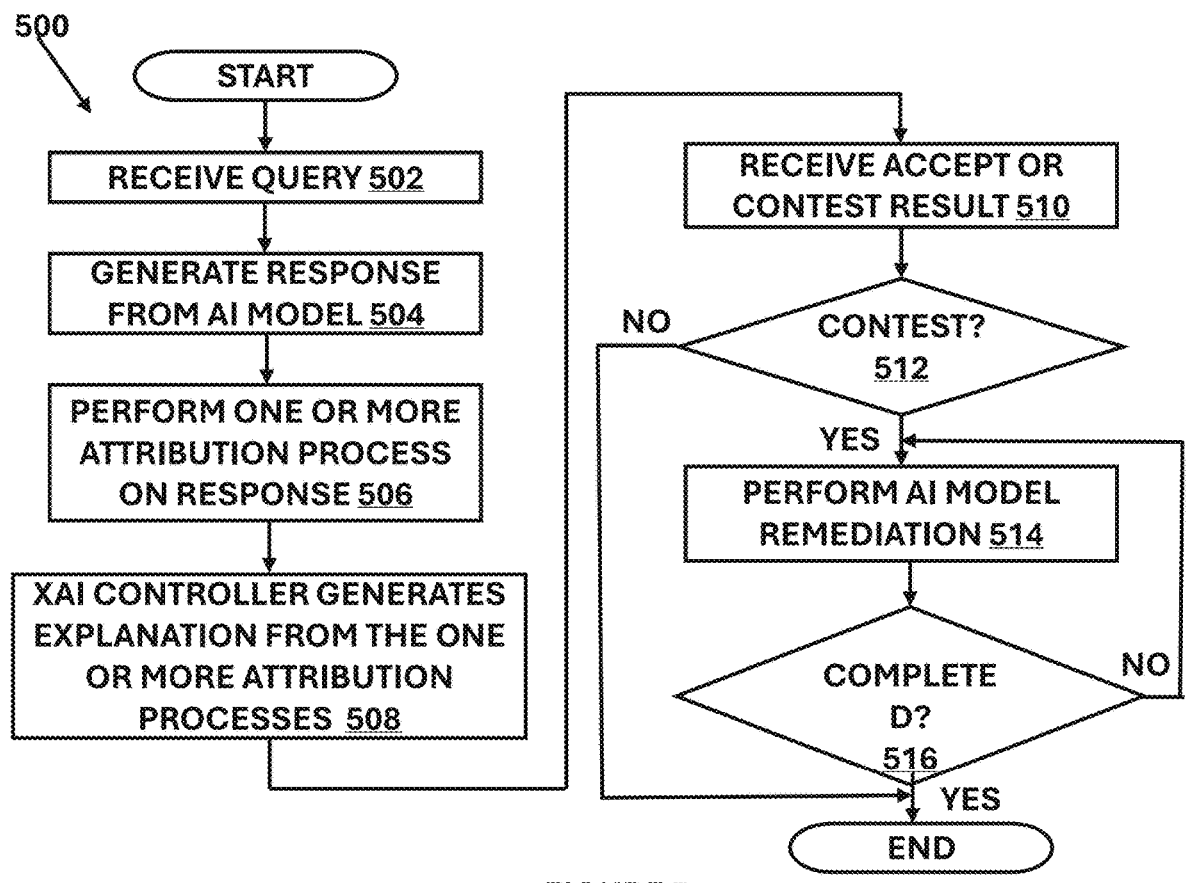
FIG. 5 illustrates more details of a method for explainability and contestability of AI models.

The explainability and contestability processes may be performed as shown in FIG. 2-3 and FIG. 5. A user may generate a query/prompt 202 (the system may receive a query 502 as shown in FIG. 5) to the AI model 106A (trained, fine tuned and/or aligned). The AI model 106A may generate a response (process 504 in FIG. 5) based on its data 302 (shown in FIG. 3) that is input to all of the attribution processes 108N1-108N3 that are part of the explainability and contestability system 106B. One or more of the attribution processes 108N1-108N3 (but possibly each of these processes) generate a result/output (such as one or more of a data attribution result, a context attribution result and a model attribution result) for the particular response from the AI model 106A (process 506 in FIG. 5).

The results from the attribution processes may be input to an aggregator explainable AI (XAI) controller 106B1 that may be implemented, in one embodiment, as a plurality of lines of computer code/instructions that are executed by a processor of the backend 106 to configure the processor to perform the explainability and contestability process that are discussed below in more detail. The aggregator XAI controller 106B1 generates an explanation of the response from the AI model 106A based on the multiple attribution processes and also generates a contest user interface 106B2 both of which are displayed to the user. The user can accept the response or contest the response (guided in part by the explanation provided by the system) (process 510 in FIG. 5). The method may determine if the user has contested the response (process 512 in FIG. 5). If the user accepts the response, then the process 500 is completed. If the user contests the response, an AI Model remediation process 514 is performed to provide feedback 304 (shown in FIG. 3) to the data sets 302 and adjust the AI model as discussed below in more detail. The feedback 304 may include synthetic data generation and augmentation or correction guided by the system's explanation (with an example of the augmentation disclosed in U.S. Pat. Nos. 12,124,932 and 12,182,678), agentic workflows for critiquing and validation (disclosed in U.S. patent application Ser. No. 19/008,444 filed Jan. 2, 2025 that is incorporated herein by reference and owned by the same assignee as the instant application) and/or access to tools for knowledge enhancement.

After the AI Model remediation process, the aggregator XAI controller 106B1 may determine if the adjustment from the AI Model remediation process 514 resolved the issue and may perform the AI Model remediation process 514 again as needed to resolve the issue. Once the issue contested by the user is resolved, the method 500 is completed. The process in FIG. 5 may be performed for each response generated by the AI model 106A so that the response is delivered to the user with the explanation based on the multiple attribution processes. Alternatively, the process 500 may be performed for a subset of responses or on a periodic basis.

Figure 4:
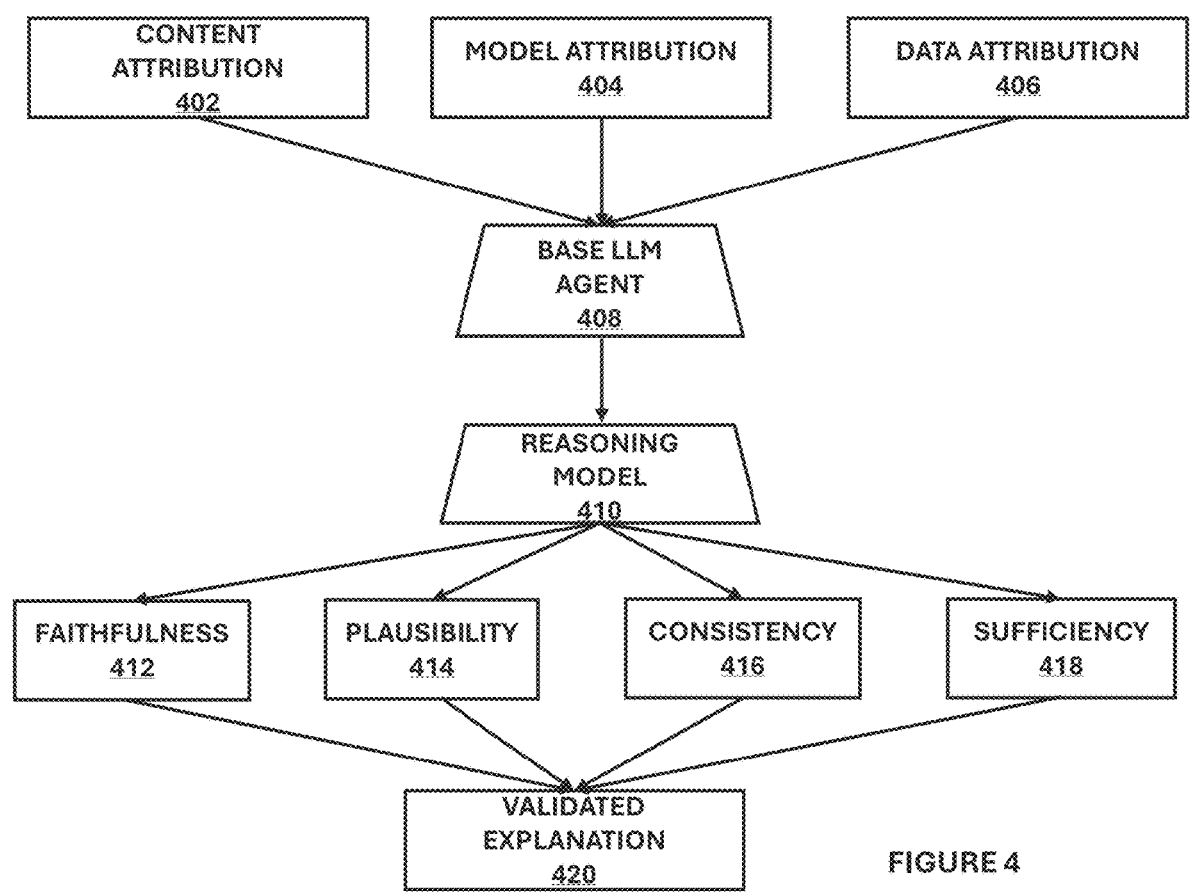
FIG. 4 illustrates a high level method of XAI aggregation including how the explanation is validated against the principles of faithfulness, plausibility, consistency, and sufficiency of explanations.

FIG. 4 illustrates a high level method of XAI aggregation including how the explanation is validated against the principles of faithfulness, plausibility, consistency, and sufficiency of explanations using the process shown in FIGS. 2-3 and 5. As shown the data generated by the content attribution 402, data generated by the model attribution 404 and data generated by the data attribution 406 may be fed into a base LLM agent 408 (an example implementation of the aggregator XAI controller 106B1) whose output is fed into a reasoning model 410 (also part of the aggregator XAI controller 106B1 in one embodiment) that performs chain of thought (CoT) prompting and modified decoding. The results from the base LLM agent 408 and reasoning model 410 may be validated against a faithfulness principle 412 relating to decision path, a plausibility principle 414 relating to business context, a consistency principle 416 relating to pattern matching and a sufficiency principle 418 relating to complete information. An end to end example is provided below. Based on all of these principles, a validated explanation 420 may be generated that is a business ready recommendation for a user to accept or contest.

Figure 6:
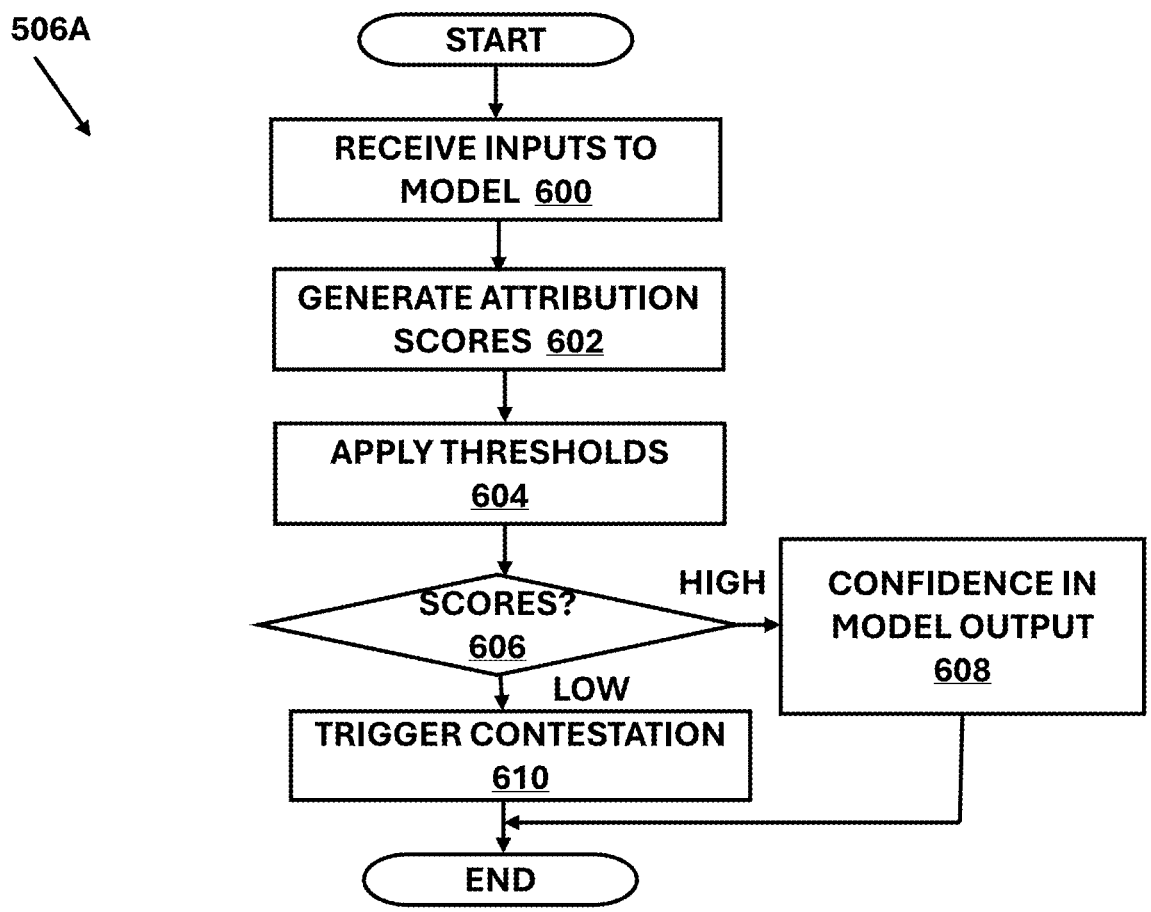
FIG. 6 illustrates a method for context attribution.

FIG. 6 illustrates a method 506A for context attribution that uncovers causal relationships between input context elements and the model's generated output. The method for context attribution may use known context attribution techniques, but then also calculate calculate a confidence score for context attribution as described in more detail below. This mechanism attributes specific components of the output to corresponding statements in the input, providing clarity on the decision-making process. The system accomplishes this attribution either discretely, through direct citations, or continuously, by generating attribution scores for each input statement. The context attribution may be performed using one or more known or yet to be developed context attributors. This context attribution method may be performed by the aggregator XAI controller 106B1 and be implemented as a plurality of lines of computer code/instructions executed by a processor of the backend 106. Alternatively, the context attribution may be performed on a third party computer system in which the response of the AI model is sent to the third party computer system and the results of the context attribution method are provided back to the aggregator XAI controller 106B1.

For the context attribution, the method receives the inputs to the model 600 and then generates the attribution scores 602. These scores are derived using various methods tailored to the model's local behavior for a given input. For instance, the system may calculate semantic similarity measures, such as BM25 or cosine similarity, to quantify alignment between input statements and generated outputs. Alternatively, it may query the LLM directly to evaluate whether one statement follows logically from another. Another approach involves iteratively altering the input slightly and fitting a simplified, interpretable model to attribute resulting output changes to specific input variations.

Once the scores are generated, the method may apply thresholds 604 (including adaptive thresholding and decision schemes) to manage hallucination risks. The thresholds may be calibrated to the problem's error tolerance. The method may then determine the scores 606 in which high attribution scores instill confidence in the model's output 608, while low scores trigger contestation signals for user review 610. By implementing these mechanisms, the system enhances both trust in and accountability for the model's outputs.

Figure 7:
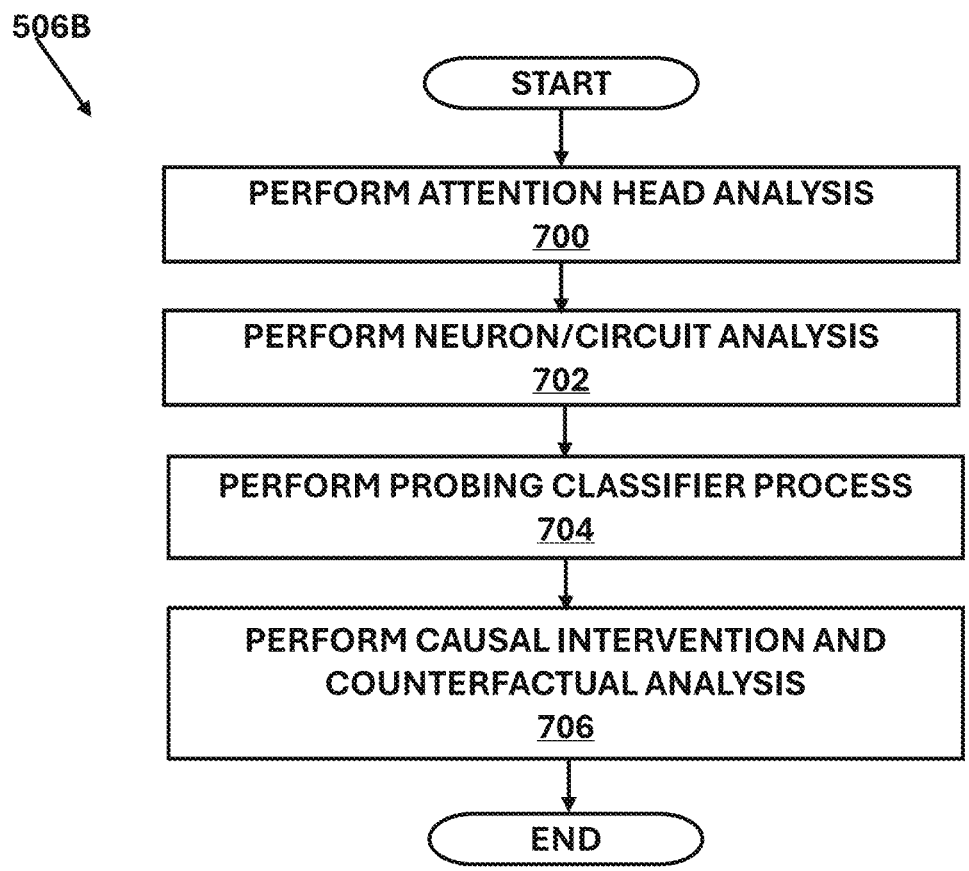
FIG. 7 illustrates a method for model attribution.

FIG. 7 illustrates a method 506B for model attribution that focuses on explaining the internal mechanisms that drive the model's behavior. The model attribution may use known model attribution techniques and may also calculate a confidence score for the model attribution as discussed below in more detail. This approach emphasizes understanding how specific components or networks within the model contribute to decision-making, rather than solely examining input-output relationships. The model attribution method may be performed by the aggregator XAI controller 106B1 and be implemented as a plurality of lines of computer code/instructions executed by a processor of the backend 106. Alternatively, the model attribution may be performed on a third party computer system in which the response of the AI model is sent to the third party computer system and the results of the model attribution method are provided back to the aggregator XAI controller 106B1.

The model attribution method may perform attention head analysis 700 where the method analyzes patterns within transformer models' attention heads. These units capture token relationships in input sequences, and their activity is often visualized or quantified to reveal their roles in tasks like dependency parsing or coreference resolution. Techniques such as head masking or pruning are utilized to identify essential attention heads, shedding light on the modularity and specialization within the model. The model attribution method may also perform neuron/circuit analysis 702 that explores the contributions of individual neurons or neural circuits to the model's functionality. Techniques such as activation maximization, ablation studies, and circuit tracing isolate specific components and assess their roles in processing information. While computationally intensive, these methods provide granular insights into the network's inner workings.

The model attribution method also may perform probing classifiers 704 which train auxiliary models on intermediate representations to determine whether latent features or desired properties are encoded in specific layers. These classifiers verify whether the model captures relevant information, though they may not establish causal relationships. The model attribution method also may perform Causal Interventions and Counterfactual Analysis 706 to probe the causal relationships within the model. By manipulating weights, activations, or intermediate states, the method observes changes in predictions, enabling the identification of causal pathways. This robust analysis, which may include techniques such as causal mediation and counterfactual editing, requires careful experimental design to maintain validity.

Figure 8:
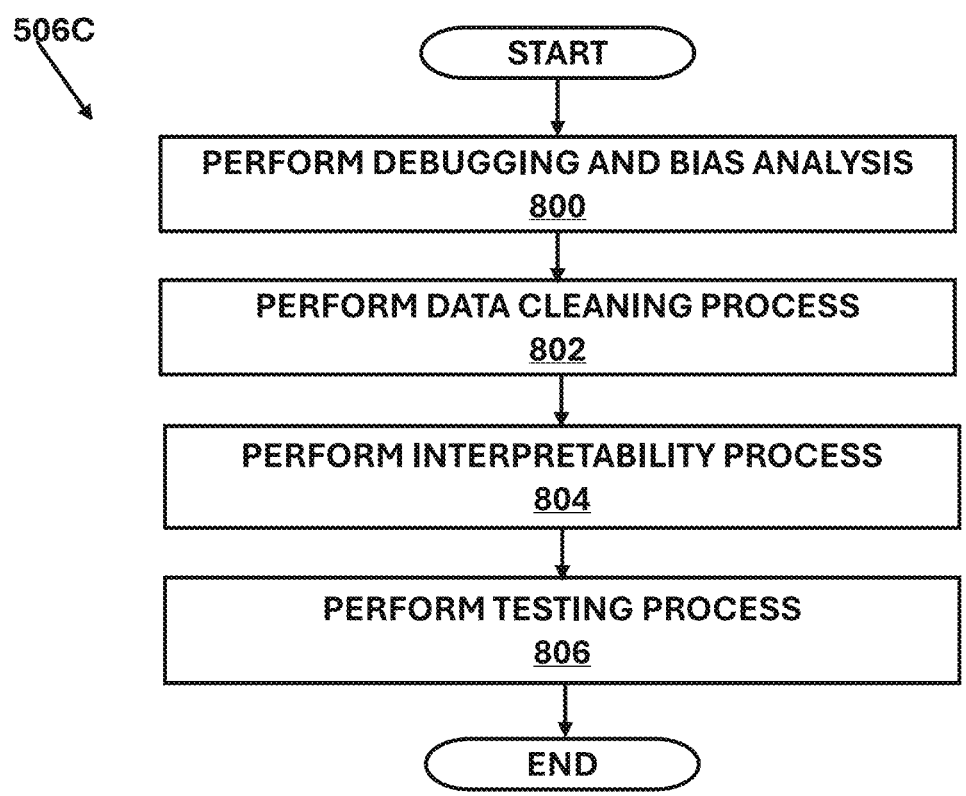
FIG. 8 illustrates a method for data attribution.

FIG. 8 illustrates a method 506C for data attribution that provides a comprehensive mechanism for understanding the relationship between a model's training data and its predictions. The data attribution method may be performed using known data attribution techniques and may further, like the other attribution methods, calculate a confidence score in part by taking the mean or median of the abovementioned top n cosine (or other) similarities as discussed below in more detail. This data attribution method may be performed by the aggregator XAI controller 106B1 and be implemented as a plurality of lines of computer code/instructions executed by a processor of the backend 106. Alternatively, the data attribution may be performed on a third party computer system in which the response of the AI model is sent to the third party computer system and the results of the data attribution method are provided back to the aggregator XAI controller 106B1.

The data attribution method is designed to address questions that may include: 1) Which training examples most strongly influence a specific prediction?; 2) How would altering the training data impact model behavior?; and/or 3) What training examples contribute to biases or errors in the model's outputs? The method identifies influential training examples linked to model outputs that enables users to trace outputs back to specific data points, offering insights into how training data shapes the model's decisions. The data attribution method may perform debugging and bias analysis 800 in which, by isolating training examples that contribute to problematic outputs, such as biased or harmful responses, the method supports targeted remediation efforts. The data attribution method also may perform a data cleaning process 802 that detects mislabeled or harmful data points, allowing for corrections that improve overall model performance and fairness.

The data attribution method also may perform an interpretability process 804 that by linking outputs to influential training examples, the process enhances transparency and user understanding of model behavior. The data attribution method also may perform robustness testing 806 that tests the model's sensitivity to specific training data by simulating the addition, removal, or modification of key examples and observing the impact on predictions. Through these mechanisms, the data attribution method empowers users to improve model performance and fairness by refining the training data and addressing its influence on predictions.

Figure 9:
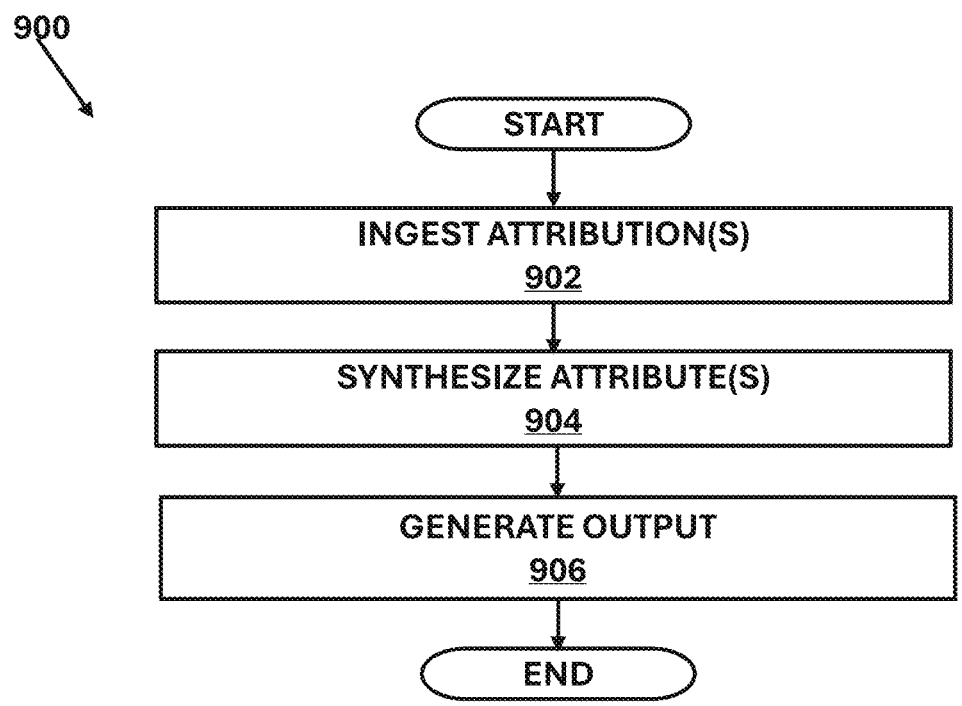
FIG. 9 illustrates a method for XAI aggregation.

FIG. 9 illustrates a method 900 for XAI aggregation. The XAI aggregation may be performed by the aggregator XAI controller 106B1 and be implemented as a plurality of lines of computer code/instructions executed by a processor of the backend 106. Alternatively, the XAI aggregation may be performed using other computer systems. The XAI Aggregation process 900 functions as an intelligent synthesis engine and process that combines multiple sources of attribution data (two or more of the context, model and data attribution results) to produce comprehensive, business-relevant, and actionable explanations for model outputs. In some embodiments, this method may leverage an LLM agent (which itself can call other models) to process and interpret XAI algorithmic attribution data.

The XAI aggregation method 900 may perform attribution ingestion 902 (that may be performed in one implementation by the LLM agent) that ingests the three types of attribution data): Context Attribution: Key propositions and user instructions that drove the original model's response; Model Attribution: Systemic biases, safety concerns, and unexpected behavioral patterns; and Data Attribution: Mappings of relevant training examples that informed the response, analogous to legal precedents or premises in logical frameworks.

The method 900, using the three types of attribution data/results, may perform attribution synthesis 904 (discussed in detail below with reference to FIG. 10) to merge/combine the attribution signals and generate an output 906 that is a natural language explanation encompassing: 1) Primary drivers of the model response; 2) Risk assessment and bias identification; 3) Confidence metrics; and Business implications. An example of the novel explanation is provided below. This aggregation method 900 transforms technical attribution data into clear, actionable business insights and the natural language outputs serve as a foundation for informed decision-making about model responses and potential remediation needs (user accept or context a response).

Figure 10:
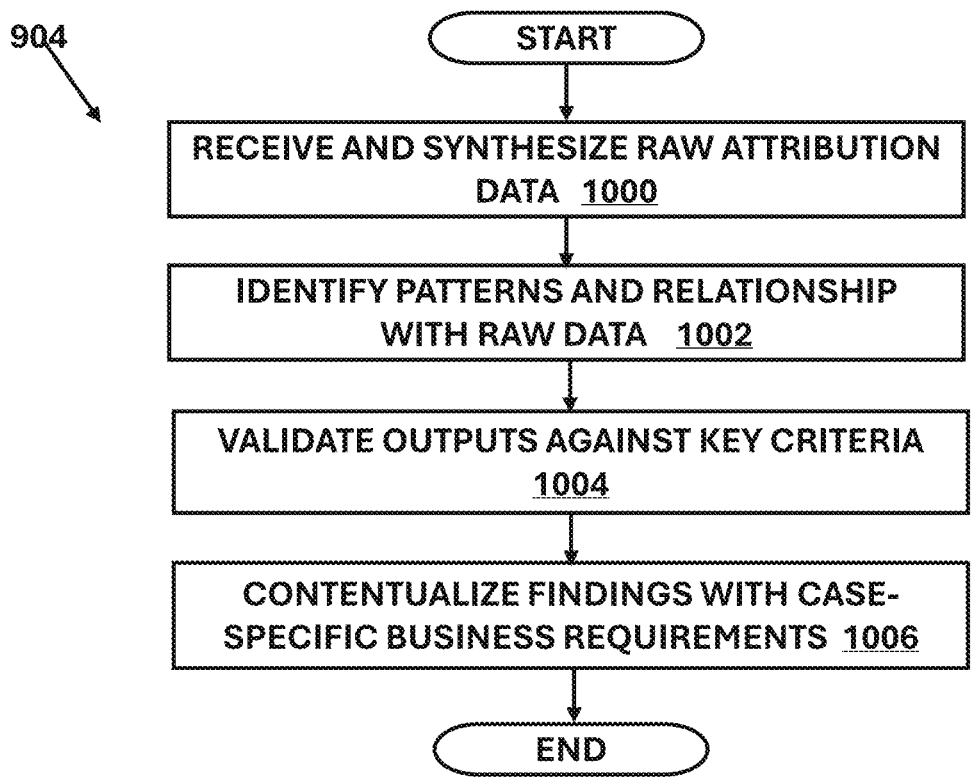
FIG. 10 illustrates more details of the synthesize attributes process in FIG. 9.

FIG. 10 illustrates more details of the synthesize attributes process 904 in FIG. 9. The synthesize attributes process may be performed by the aggregator XAI controller 106B1 and be implemented as a plurality of lines of computer code/instructions executed by a processor of the backend 106. Alternatively, the synthesize attributes process may be performed using other computer systems. The method may receive the three types of attribution data and may synthesize that raw attribution signals/data 1000 and detect whether there is conflicting information among the attribution sources, or whether the sources highlight different pieces of complementary information that suggest that they should be synthesized/combined. The method 904 may, using the synthesized attribution data/signals, identify (1002) meaningful patterns and relationships among the raw attributions to produce a sufficient explanation that is also plausible.

The method 904 may validate the output/explanation (1004) against the key criteria including: 1) Faithfulness to the model; 2) Plausibility of explanations; 3) Sufficiency of evidence; and Internal consistency. The method may then contextualize findings (1006) within case-specific business requirements and filter technical complexity of attribution data to surface business-relevant, actionable insights.

For example, the explanation provided in the example below demonstrates adherence to key validation criteria by maintaining faithfulness to the model's actual processing mechanisms rather than post-hoc rationalization, while presenting information with plausibility through business-relevant terms and clear logical flow from evidence to conclusions about FDA cosmetics business registration requirements. Internal consistency is maintained through coherent alignment between attribution sources that do not contradict each other, highlighting overlapping information such as the address requirement. Finally, the explanation achieves sufficiency of evidence by incorporating insights from all three attribution sources (Context, Model, and Data) which collectively support the high confidence score (0.89), highlighting complementary information and omitting superfluous details.

Figure 11:
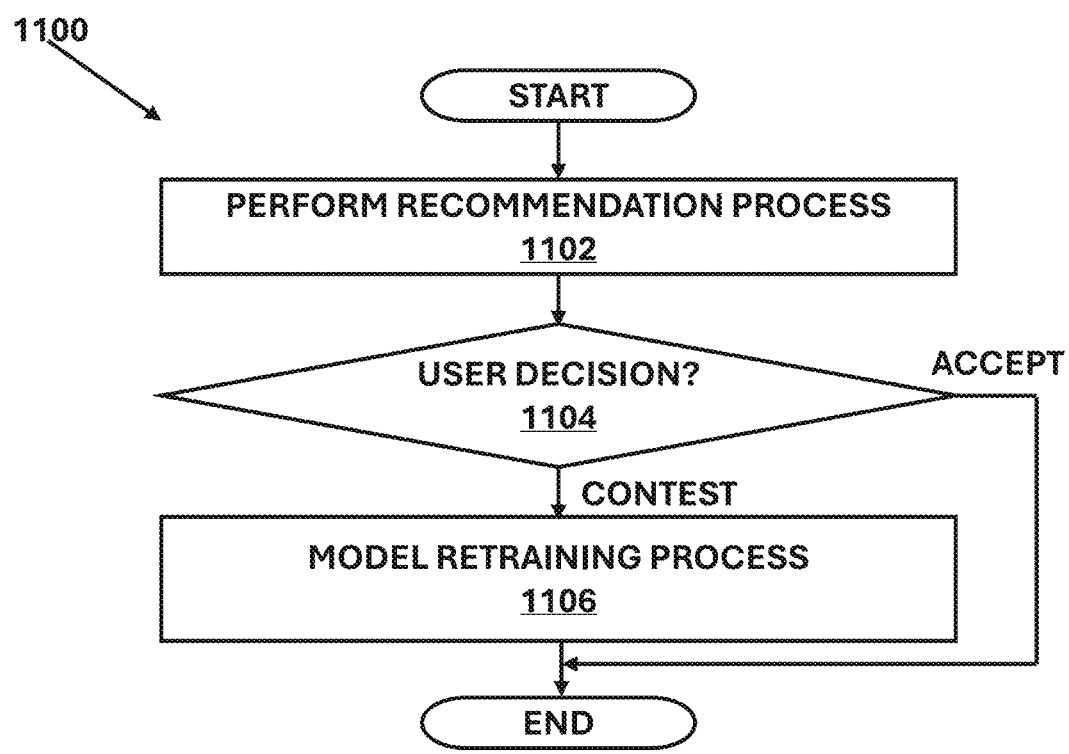
FIG. 11 illustrates a model remediation process.

Based on the XAI aggregation process, a method 1100 for model remediation is performed as shown in FIG. 11. The model remediation may be performed by the aggregator XAI controller 106B1 and be implemented as a plurality of lines of computer code/instructions executed by a processor of the backend 106. Alternatively, the model remediation process may be performed using other computer systems or may be performed by a third party computer system/processor with the remediated model being returned to the system. Thus, following the XAI Aggregation process, the system and method implements a two-step contestability process. The method may first generate a recommendation 1102. In particular, the method may provide a recommended course of action to the user regarding the original model response ("accept" or "contest"), based on the LLM agent's assessment of the quality of the final explanation (see PROPERTIES OF AI EXPLANATIONS) and its business implications. Examples of the recommendations and the process to generate are detailed below. The recommendation(s) are provided to a user/displayed to the user.

The method may determine if the user makes a decision (1104) with the method 1100 being completed if the user accepts the response based on the explanation and recommendation. If the user decides to contest the recommendation for the particular response generated by the AI model, a model retraining process (1106) may be performed. In one embodiment, if the user contests the output, the system/method offers two remediation paths which are: 1) generating new training data and retraining the model; or 2) a guardrail implementation, one path being selected by the user or recommended by the system.

If the new training data path is chosen, then new training data, e.g. question-answer (QA) pairs, may be generated and the user is provided the option to trigger model retraining and deployment in order to adjust model behavior against the identified issues in the recommendation. The model retraining can be achieved through continued Fine-tuning, or Reinforcement Learning through Human Feedback (RLHF) training techniques, such as Direct Preference Optimization (DPO); for DPO, an input prompt is paired with both a preferred and non-preferred response.

If the guardrail path is chosen, the method may develop inference-time rules which serve as protective measures against identified issues. Both the retraining and the guardrail path may be performed in accordance with the methods and system disclosed in U.S. Pat. Nos. 12,124,932 and 12,182,678 that are incorporated herein by reference.

The XAI aggregation framework ensures a systematic approach to explaining model outputs while maintaining business relevance and providing clear paths for model improvement if needed or desired. The XAI Aggregator process employs a routing mechanism to handle potentially conflicting attribution data from different sources. When conflicts arise between attribution types (such as discrepancies between Context and Model Attribution results), the LLM agent routes this data to a specialized reasoning model. This model can be either a dedicated reasoning-optimized system (comparable to advanced reasoning models such as OpenAI's o1 or o3 models) (disclosed in more details in Zeng et al., *Scaling of Search and Learning: A Roadmap to Reproduce o1 from Reinforcement Learning Perspective*, OpenMOSS (Dec. 18, 2024) or a base instruction model that has been specifically fine-tuned to resolve attribution inconsistencies.

The reasoning model may employ two primary approaches to resolve these conflicts. The first approach utilizes chain-of-thought (CoT) prompting to explicitly map out the logical steps connecting different attribution signals. The second approach leverages a modified decoding process that explores multiple potential reasoning paths (WANG et al. Chain-of-Thought Reasoning without Prompting. Google Deepmind May 23, 2024). Rather than using standard greedy decoding, the system examines top-k alternative token sequences to uncover inherent chains of reasoning. This approach is particularly valuable because the presence of coherent reasoning chains in these alternative paths correlates strongly with higher confidence in the final explanation. Through either path, the reasoning model constructs a formal logical representation of the explanation structure, systematically validating and improving the explanation's faithfulness to the original model's decision process, its plausibility for business stakeholders, its consistency, and its sufficiency (resolving the bias-variance tradeoff) in capturing essential reasoning without extraneous details.

Example of the Explainability and Contestability Pathway

The example below provides an illustrative example of the system and methods disclosed above. The example traces the pathway from model outcome (response to AI model query—process 502, 504 in FIG. 5) to an XAI aggregator-informed recommendation for the model (processes 506-516 in FIG. 5 and FIGS. 6-11) so that a user who submitted the query can determine whether the model outcome (response) should be accepted or contested (106B2 in FIGS. 2-3), including potential model remediation strategies (process 514 in FIG. 5 and FIG. 11). This example starts with a chatbot that has been aligned with US Food and Drug Administration (FDA) principles (the alignment being done as disclosed in U.S. Pat. Nos. 12,124,932 and 12,182,678 that are incorporated herein by reference)—specifically, a policy-aligned generalist instruction model to a particular section of Title 21 of the United States Code. Title 21 primarily deals with food and drugs, including cosmetics; the particular section outlines the federal regulations regarding the manufacture, distribution, and sale of food, drugs, and cosmetics to ensure safety, efficacy, and security.

Initially, in the example, a query is received from the user and directed to the fine-tuned model (process 502 in FIG. 5) and the example query may be: "I am getting ready to register my new cosmetics business and need to know which information I should prepare beforehand. So far, my new company has an address. What other information do I need to know?" The AI model may generate an initial response (process 504 in FIG. 5) and may be found in the below model training example (a question-answer pair that was used for supervised fine-tuning of the model):

Question: "What details must be provided when registering a cosmetic product establishment?"
Answer: "The registration form FD-2511 requires the establishment's name, address with ZIP code, all business trading names, and whether it operates as a manufacturer, packer, or both."

In this example, the user can reasonably expect, under normative model query parameters and assuming successful model fine-tuning, a response to the above query that closely matches its corresponding training data example.
Attribution Data Computation:

In the example, a computation of algorithmic attribution data (Context, Data, and Model Attribution) (process 506 in FIG. 5) may be performed with respect to the initial response. Each of these attribution computations generate one or more pieces of attribution data/signals that are merged together for use by the XAI aggregator.
Context Attribution:

As described above, this source of attribution focuses on identifying which parts of the input context or prompt are responsible for driving a generative AI model's response. This source of attribution is particularly relevant for generative models such as LLMs, where the output depends heavily on nuanced patterns in the input. In the example query to the model above, one exemplary Context Attribution system—in particular, ContextCite—might, for example, show that masking parts of the user query such as "new cosmetics company" and "address" leads to a decreased conditional probability of obtaining certain sub-sequences of the model response dealing with registering a cosmetics company, particularly the part that mentions the address of the company. This context attribution data indicates that these portions of the model response are strongly conditioned on (i.e. "contributed to" by, in the terminology of ContextCite) these portions of the model query. A confidence score for Context Attribution (used later, described below) can be computed by taking the mean or median of the top n differences between the conditional probabilities of obtaining the entire model response (or sub-sequences of the model response) with or without masking of certain sub-sequences of the model query. A chunking procedure is used to select sub-sequences of the model query and response.
Data Attribution:

As discussed above, this source of attribution focuses on tracing the influence of specific data points or subsets of the training dataset on the AI model's decisions. One exemplary data Attribution system comprises the utilization of a vector store of the embedded training data examples, and a search against that vector store to uncover the top n most similar training examples as compared to the user's model query and/or the model response (e.g. via cosine similarity, or a hybrid search comprised of keyword and vector similarity scores). Using a cosine (or other) similarity search against this vector store, the training example mentioned above can reasonably be expected to be returned in the set of most similar training examples. This includes details not included in the sequences uncovered by Context Attribution. In particular, context attribution revealed that the model response was sensitive to the word "address" in the input context, while data attribution uncovers a data training example that includes not only "address" but also "establishment's name", "all business trading names", and "whether it [the company] operates as a manufacturer, packer, or both". A confidence score for Data Attribution can be computed in part by taking the mean or median of the abovementioned top n cosine (or other) similarities.
Model Attribution:

This source of attribution focuses on dissecting the internal mechanisms of AI models to determine which parts of the model architecture are responsible for specific outcomes, such as the extraction of the strength or patterns of attention head activations. In the context of attention head patterns, focused (modular) attention patterns might indicate: Direct answer found in context; Clear logical path to conclusion; and/or High confidence in relevance of specific information. Diffuse, weak attention patterns might indicate: Model had to "piece together" information from multiple sources; Required more complex reasoning or inference; Potential uncertainty or ambiguity in available information; and/or Possible need to "fill in gaps" with learned knowledge, and thus increased risk of hallucination.

In the present example, the model is fine-tuned to serve as a straightforward question-and-answering system and focused attention activations should provide some signal as to the architectural focus of the model response given the query. The focused attention activations may be represented in part as the inverse variance across the mean or median attention scores of the various attention heads, where these attention scores are the result of the softmax of the scaled query-key dot product, after which a weighted sum with the value vectors is performed to produce the attention output.

For the example above, a model attribution confidence may be determined. In the example, focused attention patterns can be expected from a model that has gained knowledge of a domain and can field relatively uncomplicated questions about that domain. This Model Attribution system can be used to assess the model input at inference and it can also be used to assess the training examples (providing the questions as input) uncovered from the Data Attribution system described above.

XAI Aggregation Process:

The XAI aggregation controller 106B1 (that is a base LLM agent in one implementation) receives the set of algorithmic attribution data from the above multiple sources (three sources for example) and prepares the data to be routed to a reasoning agent, that may be implemented as a specialized LLM reasoning agent. The XAI aggregation controller 106B1 detects whether there is conflicting information among the attribution sources, or whether the sources highlight different pieces of complementary information that suggest that they should be synthesized. In the foregoing example, the XAI aggregation controller 106B1 would, for example, identify that Context and Data Attribution provide partially overlapping and, to the extent that they differ, complementary perspectives on the contributors to the model response, namely all the pieces of information required to file the FDA form for registering a new cosmetics company (address, name or names of the business, whether the company is a manufacturer or packer, etc.).

Once the XAI aggregation controller 106B1 packages the attribution data and tags the data with indicators such as "conflicts with" or "complements" information "X, Y, Z", this data may be routed to the reasoning agent, such as an LLM reasoning model, that specializes in explicit or internal chain of Thought (CoT) reasoning including quantitative reasoning. The reasoning agent's task is to complete the synthesis of the attribution data and provide a recommendation to the model user as to whether the original model outcome should be accepted or contested based on the signals gleaned from the synthesized attribution data, replete with a business-contextualized, easy-to-understand model response explanation. This payload should exhibit faithfulness to the original model's decision process, plausibility for business stakeholders, internal consistency, and sufficiency in capturing essential reasoning and information.

The recommendation for whether the user should accept or contest the model outcome is based on an overall confidence score, where:

confidence_score=(
  $\alpha$*context_confidence+ #Computed from Context Attribution
  $\beta$*data_confidence+ #Computed from Data Attribution
  $\gamma$*model_confidence #Computed from Model Attribution)
where $\alpha$, $\beta$, and $\gamma$ are learnable parameters;
and the overall confidence_score is normalized between 0 and 1.0.

The overall confidence can be mapped to a recommendation to the user. For example:
>0.8: High confidence range—suggest acceptance of model outcome
0.6-0.8: Moderate confidence range—agnostic/no recommendation
<0.6: Low confidence range—suggest contestation Note that a lower confidence score could result from the presence of hallucinated (mis)information in the model response. For example, if the model response to the question for the registration requirements for a new cosmetics business incorrectly includes the company's phone number in the list of requirements, the confidence scores associated with the different attribution sources would be lower. In the example above, the response in the example likely achieves a high confidence.

Explanation of Model Response and Business Ready Assessment

The AI model's response about the FDA cosmetic establishment registration requirements example achieves a high overall confidence score of 0.89, suggesting strong reliability. The response achieves the high level of confidence for at least the following reasons: 1) the attribution analysis described above reveals strong supporting evidence across multiple sources with both context attribution and data attribution sources/signals both strongly confirm the requirement for "address with ZIP code", providing overlapping validation for this critical piece of information for this example; 2) the data attribution method uniquely identified, with high confidence, two additional requirements: the "establishment name" and the specification of "whether the business is a manufacturer or packer or both"; 3) the model attribution (via the attention head analysis discussed above) shows notably strong and focused attention patterns when processing these specific requirements, indicating the model is accessing well-established knowledge pathways rather than engaging in speculation and potentially hallucinating misinformation. This provides additional confidence that the model is drawing from firmly established knowledge rather than making uncertain inferences.

In this example, the high overall confidence score (0.89) combined with the clear, specific requirements uncovered through multiple attribution sources indicates this response is both quantitatively validated and practically actionable. As a result, business users can confidently rely on these three specific requirements for FDA form FD-2511: 1) Establishment name (including any other business trading names); 2) Address with ZIP code; and manufacturing/packing status specification.

In this example, the possible business ready recommendation is to accept the model response due to the high confidence and a user can proceed with confidence in using this information for cosmetic establishment registration purposes.

As discussed above, when the confidence score is not high, the method may generate a no recommendation when the confidence score is in a middle range and may generate a suggested contestation for the model when the confidence score is in the lower range. The different contesting options are described above.

User Decision and Potential Model Remediation:

The reasoning agent routes the payload from the XAI aggregation process back to the XAI aggregation controller 106B1 which then provides the explanation and recommendation to the user. The user, when provided the model outcome explanation, overall confidence score, and recommendation, can choose whether to accept or contest the original model response. If the user chooses to contest the response, the user is given the option by the agent to edit or compose the desired response (e.g. remove incorrect information or add missing information) and the user can attempt to discover what is wrong with the response by consulting source material if needed. The user can then choose to add the revised response to a database of revised questions and answers (and potentially kick off a synthetic data generation workflow based on these revisions) to be used for model retraining (and subsequent re-deployment).

Alternatively, the user can opt to incorporate the revised response into a guardrail to be deployed alongside the model to be triggered at inference time, where future identical or similar queries will be checked against existing guardrails such that the model response is either replaced or automatically revised by the revisions. An example guardrail is below. Either natural language inference (NLI) models or an LLM can be used to perform the similarity judgment in the guardrail below.

Guardrail:

If the model query and/or response is/are similar to the below question and answer, then use this predefined answer as the basis for the response:

Question: What details must be provided when registering a cosmetic product establishment?

Answer: The registration form FD-2511 requires the establishment's name, address with ZIP code, all business trading names, and whether it operates as a manufacturer, packer, or both.

An incorrect answer that results from querying the model, such as one that includes "company's phone number" in the list of registration requirements, would therefore be corrected by the guardrail to match the above answer.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

Although specific machine-learned models are described above, other types of machine-learned models can additionally or alternatively be used. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
   retrieving, by a computer system hosting an explainability system, a response from an artificial intelligence (AI) model to a query;
   performing, in response to the query and the AI model by the computer system hosting the explainability system, a context attribution process that determines user instructions that drove the response, a model based attribution process that determines biases, safety concerns and unexpected behavior of the AI model and a data based attribution process that determines training data that informed the response that together generate a plurality of attribution results;

generating, by the computer system hosting the explainability system, an explanation for the response from the AI model using the plurality of attribution results by detecting conflicting information between the plurality of attribution results and detecting complementary information between the plurality of attribution results to generate the explanation;

validating, by the computer system hosting the explainability system, the generated explanation against a faithfulness principle that the generated explanation accurately reflect a reasoning of the AI model, a plausibility principle that the generated explanation be understandable by a human, a consistency principle that a second explanation to a similar query yields the second explanation similar to the generated explanation and a sufficiency principle that the generated explanation accurately describes a decision making process of the AI model; and displaying, on a display of a computing device, the validated explanation for the response from the AI model.

2. The method of claim 1 further comprising generating, by the computer system hosting the explainability system using the validated explanation, a contestability recommendation for the AI model response and presenting, on the display of the computing device, the contestability recommendation for the AI model response.

3. The method of claim 2 further comprising remediating, by the computer system hosting the explainability system, the AI model response if the AI model response is contested.

4. The method of claim 1 further comprising generating, by a computer system hosting the artificial intelligence (AI) model, the response to the query.

5. The method of claim 1, wherein the plurality of attribution results further comprises a result from each of the context attribution process, the model based attribution process and the data based attribution process.

6. The method of claim 2, wherein generating the contestability recommendation further comprises generating a confidence score for each attribution process and combining the generated confidence scores into the contestability recommendation.

7. The method of claim 3, wherein remediating the AI model response further comprises one of determining a revised response and adding the revised response to a set of training data used to train the AI model or determining a revised response and installing a guardrail based on the revised response.

8. The method of claim 7, wherein installing the guardrail further comprises applying the guardrail, after retrieving the response from the AI model, to the retrieved response from the AI model.

9. The method of claim 1, wherein the AI model is one of a large language model, a large multimodal model, a small language model and a small multimodal model.

10. A system, comprising:
a computer system hosting an explainability system that retrieves a response from an artificial intelligence (AI) model to a query, performs, in response to the query and the AI model, a context attribution process that determines user instructions that drove the response, a model based attribution process that determines biases, safety concerns and unexpected behavior of the AI model and a data based attribution process that determines training data that informed the response that together generate a plurality of attribution results, generates an explanation for the response from the AI model using the plurality of attribution results by detecting conflicting information between the plurality of attribution results and detecting complementary information between the plurality of attribution results to generate the explanation, and validates the generated explanation against a faithfulness principle that the generated explanation accurately reflect a reasoning of the AI model, a plausibility principle that the generated explanation be understandable by a human, a consistency principle that a second explanation to a similar query yields the second explanation similar to the generated explanation and a sufficiency principle that the generated explanation accurately describes a decision making process of the AI model; and a computing device, capable of connecting to the computer system, having a display that displays the validated explanation of the AI model response.

11. The system of claim 10, wherein the computer system generates a contestability recommendation for the AI model response using the validated explanation and wherein the display of the computing device displays the contestability recommendation for the AI model response.

12. The system of claim 11, wherein the computer system remediates the AI model response if the AI model response is contested.

13. The system of claim 10 further comprising a second computer system hosting the artificial intelligence (AI) model that generates the response to the query.

14. The system of claim 10, wherein the plurality of attribution results further comprises a result from each of the context attribution process, the model based attribution process and the data based attribution process.

15. The system of claim 11, wherein the computer system generates a confidence score for each attribution process and combines the generated confidence scores into the contestability recommendation.

16. The system of claim 12, wherein the computer system one of determines a revised response and adds the revised response to a set of training data used to train the AI model and remediates the AI model or determines a revised response and installs a guardrail based on the revised response to remediate the AI model.

17. The system of claim 10, wherein the AI model is one of a large language model, a large multimodal model, a small language model and a small multimodal model.

18. An explainability apparatus, comprising:
a computer have a processor and a plurality of lines of instructions executed by the processor to configure the computer to:
retrieve a response from an artificial intelligence (AI) model to a query;
perform, in response to the query and the AI model, a context attribution process that determines user instructions that drove the response, a model based attribution process that determines biases, safety concerns and unexpected behavior of the AI model and a data based attribution process that determines training data that informed the response that together generate a plurality of attribution results;
generate an explanation for the response from the AI model using the plurality of attribution results to detect conflicting information between the plurality of attribution results and detect complementary information between the plurality of attribution results to generate the explanation; and validate the generated explanation against a faithfulness principle that the generated explanation accurately reflect a reasoning of the AI model, a plausibility principle that the generated explanation be understandable by a human, a consistency principle that a second explanation to a similar query yields the second explanation similar to the generated explanation and a sufficiency principle that the generated explanation accurately describes a decision making process of the AI model.

19. The apparatus of claim 18, wherein the computer is further configured to generate a contestability recommendation for the AI model response based on the validated explanation.

20. The apparatus of claim 19, wherein the computer is further configured to remediate the AI model response if the AI model response is contested.

21. The apparatus of claim 18, wherein the plurality of attribution results further comprises a result from each of the context attribution process, the model based attribution process and the data based attribution process.

22. The apparatus of claim 19, wherein the computer is further configured to generate a confidence score for each attribution process and combine the generated confidence scores into the contestability recommendation.

23. The apparatus of claim 20, wherein the computer is further configured to one of determine a revised response and add the revised response to a set of training data used to train the AI model to remediate the AI model or determine a revised response and install a guardrail based on the revised response to remediate the AI model.

24. The apparatus of claim 23, wherein the computer is further configured to apply the guardrail, after retrieving the response from the AI model, to the retrieved response from the AI model.

25. The apparatus of claim 18, wherein the AI model is one of a large language model, a large multimodal model, a small language model and a small multimodel model.

26. The apparatus of claim 18 further comprising a computing device that executes the AI model and sends the response from the AI model and query to the computer.

* * * * *